June 1, 1926.
F. J. CAMPBELL
DETACHABLE MOTOR CRANK
Filed Oct. 5, 1925
1,587,470
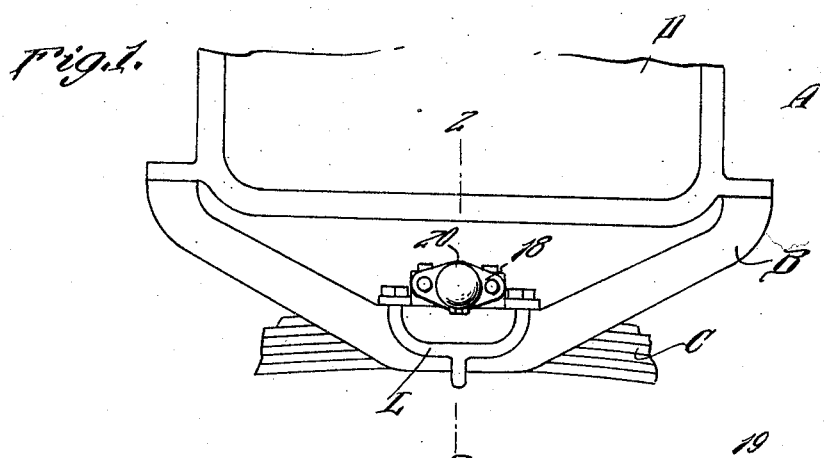
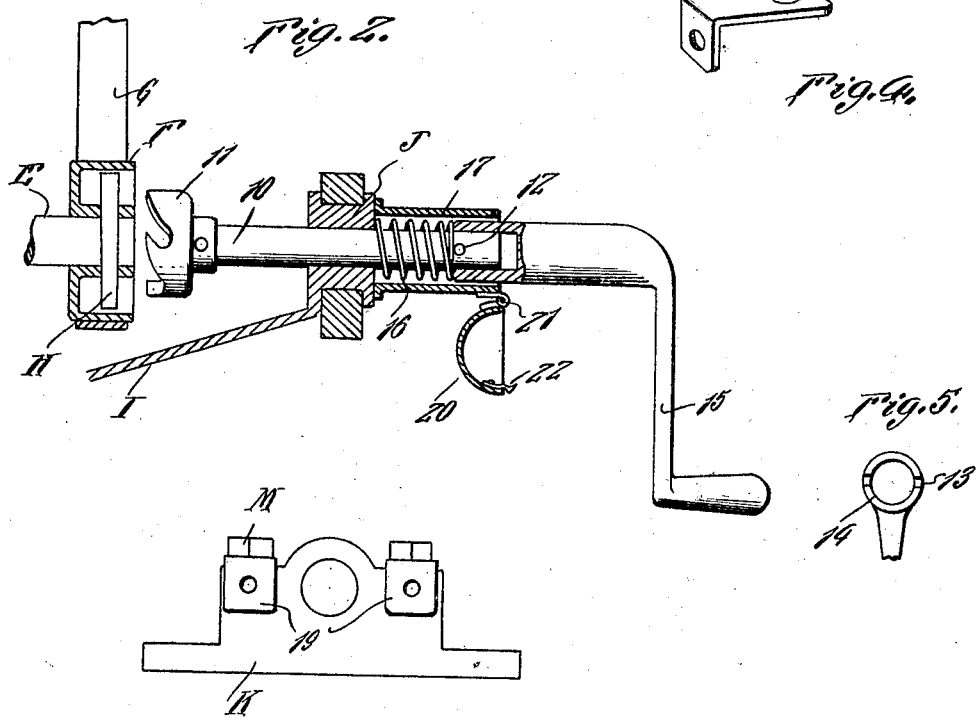
F. J. Campbell
INVENTOR
BY Victor J. Evans
ATTORNEY Patented June 1, 1926.

1,587,470

UNITED STATES PATENT OFFICE.

FRANK J. CAMPBELL, OF YOUNGSVILLE, PENNSYLVANIA.

DETACHABLE MOTOR CRANK.

Application filed October 5, 1925. Serial No. 60,635.

This invention relates to cranking devices for the engines of motor vehicles and has for its object the provision of a novel detachable crank structure embodying a permanently mounted shaft element carrying the usual starting crank ratchet, together with a detachable crank proper which may be ordinarily carried in the tool box which may be easily engaged with the permanently mounted ratchet carrying shaft whenever it is necessary to crank the engine, as for instance when making test of compression and the like, or in the case of failure of the starter.

An important object of the invention is to provide a device of this character in which the permanently mounted shaft element is enclosed within a housing member having a movably mounted cap which will ordinarily act to exclude dust, dirt and water, but which may be readily swung out of the way when use of the hand crank is necessary.

An additional object is to provide a device of this character which will be simple and inexpensive in manufacture, easy to install, positive in action, efficient and durable in service, and a general improvement in the art.

With the above and other objects and advantages in view, the invention consists in the details of construction, the arrangement and combination of parts to be hereinafter more fully described and claimed, and illustrated in the accompanying drawings, in which:

Figure 1 is a fragmentary front elevation of the forward portion of a motor vehicle showing the device in applied position thereon.

Figure 2 is a section taken on the line 2—2 of Figure 1, with the cap in open position and the detachable crank applied.

Figure 3 is a detail elevation of the support alone.

Figure 4 is a perspective view of a bracket element, and

Figure 5 is a detail end elevation of the crank.

Referring more particularly to the drawings, the letter A designates a portion of the front of a motor vehicle including the front cross bar or member B of the frame which is mounted upon the front spring C and which forms part of the frame structure carrying the radiator D. The letter E indicates the crank shaft of the motor carrying the usual belt pulley F engaged by the fan belt G and held in place by a transverse pin H adapted to be engaged by the cranking device for the purpose of turning over the motor and effecting starting. The letter I designates the front end portion of the crank case or engine pan which, as is well known, is provided with a bearing J mounted within a bracket K mounted on the top of the central portion of the front cross bar B and held by means of a U-bolt L.

In carrying out the invention, I provide a short shaft 10 which is journaled through the bearing J and which carries a starting ratchet 11 adapted to be engaged with the pin H within the pulley F for turning over the motor shaft. The shaft 10 projects considerably beyond the bearing J and carries a transverse pin 12 adapted to be engaged by slots 13 in the hub portion 14 of the detachable hand crank 15 of any ordinary or preferred type which is of course socketed to engage upon the forward end of the shaft 10. A coil spring 16 surrounds the shaft 10 and abuts against the front face of the bearing J and against the pin 12 for normally holding the shaft 10 in its outermost position with the ratchet structure 11 out of engagement with the pin H of the pulley.

Disposed against the front of the bearing member J is a cylindrical housing 17 having an attaching portion 18 at each side thereof bolted, riveted or otherwise secured to a pair of angular brackets 19 which are disposed against the front and upon the top of the bearing support K and held by the usual studs M provided for holding the member K in assembled relation. This housing member 17 surrounds and entirely encloses the spring 16 and shaft 10 so as to protect the same against injury as will be readily apparent.

Another feature of advantage is the provision of a cover or cap 20 hinged at 21, preferably by a spring hinge, upon the lower edge of the forward end of the housing 17 and provided with a catch 22 detachably engageable within the open forward end of the housing for normally maintaining the cap in closed position.

In the use of the device, it is obvious that under ordinary circumstances, the appearance is as indicated in Figure 1. Whenever it is necessary to crank the motor by hand, the cap 20 should be swung into the open position shown in Figure 2, and the hub portion 14 of the hand crank slipped over the projecting end of the shaft 10 with the pin 12 engaging within the slots or notches 13. The crank is then turned in a well known manner to effect starting. After the engine has been started the crank is withdrawn and the cover 20 returned to its closed position so as to exclude dust, dirt and water. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In a motor vehicle including a frame having a front cross member, a motor having its shaft equipped with a pulley provided with a transverse pin element, a bearing member on the front cross bar of the frame, in alinement with the motor shaft, a bearing at the forward end of the motor engaged within said first named bearing, said first named bearing having a removable cap portion held in place by studs, angular bracket members engaged upon said studs and having attaching portions at their forward ends, a shaft journaled through said second named bearing member and carrying a ratchet device engageable with said pin, a transverse pin extending through said shaft forwardly of the bearing members, a coil spring surrounding the shaft and bearing against the second named pin and the forward face of the second named bearing member for normally holding the shaft in its forwardmost position, a crank having a slotted hub portion socketed and notched for engagement upon the forward end of the shaft and to receive said second named pin, a housing member having lateral lugs secured upon the attaching forward portions of said angular brackets, and a cap detachably engaged upon the forward end of said housing to serve as a closure therefor upon removal of the crank.

In testimony whereof I affix my signature.

FRANK J. CAMPBELL.